United States Patent [19]

Kubelik

[11] Patent Number: 4,879,569
[45] Date of Patent: Nov. 7, 1989

[54] MULTIPLE SOURCE CHARGED PARTICLE GENERATION

[75] Inventor: Igor Kubelik, Mississauga, Canada

[73] Assignee: Delphax Systems, Mississauga, Canada

[21] Appl. No.: 284,267

[22] Filed: Dec. 14, 1988

[51] Int. Cl.[4] ............................................. G01D 15/00
[52] U.S. Cl. ..................................... 346/159; 346/155
[58] Field of Search ............... 346/158, 154, 1.1, 150, 346/153.1, 155; 400/119

[56] References Cited

U.S. PATENT DOCUMENTS

4,679,060  7/1987  McCallum et al. ................. 346/159
4,691,213  9/1987  Inaba et al. ......................... 346/159

Primary Examiner—Arthur G. Evans
Attorney, Agent, or Firm—Rogers & Scott

[57] ABSTRACT

There is disclosed a multiple source charged particle generator having first electrodes and second electrodes separated by a dielectric. The second electrodes define independent discharge locations and each of the discharge locations comprises a plurality of discharge sites. The generator is particularly for use in charge transfer imaging of the type used in preparing a latent image on a dielectric, toning the image and transferring the toned image onto a receptor such as paper.

13 Claims, 6 Drawing Sheets

MULTIPLE SOURCE CHARGED PARTICLE GENERATION

FIELD OF INVENTION

This invention relates to the generation of charged particles and more particularily to print cartridges provided with multiple charge particle source electrodes for use in printers utilising charge transfer imaging.

DESCRIPTION OF PRIOR ART

The use of electrical potentials to break down gases to produce charged particles for imaging is widespread and is utilised in a variety of ways. One example of this form of imaging is used in gas discharge display devices which directly utilise the glow produced by excited ions and atoms returning to the ground state following a discharge. By providing an array of discharge devices in a screen, the devices may be struck or extinguished to produce an image or display in the required form. Examples of such devices are described in U.S. Pat. No. 3,735,183 issued May 22, 1973 to Walters, and U.S. Pat. No. 4,037,130 issued July 19, 1977 to Mimitsuko et al.

Other imaging devices use charged particles to create latent charge images on adjacent surfaces. In this form of charge transfer imaging, a pattern of charge corresponding to a desired image is formed as a latent charge image on a dielectric surface such as the surface of a print drum or image cylinder. The dielectric surface is then moved past a toner brush to cause toner of opposite charge to adhere to charged areas of the dielectric surface, and thus, to form a toner image. The toner image then passes through a nip between the drum and a pressure roller and is transferred and fused simultanteously, or in separate operations, to a copy material, for example copy paper, which passes through the nip with the toner image. After the transfer and fusing operations, the dielectric surface is treated to remove any residual toner and charge.

Various forms of apparatus have been developed to produce the desired pattern of charge on the dielectric surface, including arrays of coaxially spaced electrodes, or spaced bar and pin electrodes, where discharges are created between the exposed faces of the electrodes. Example of such apparatus are described in U.S. Pat. Nos. 3,438,033 issued Apr. 8, 1969 and 3,235,942 issued Feb. 22, 1966 to Howell et al.

Perhaps the most successful apparatus utilising this principle is that in which charged particles are generated in the air by applying high frequency voltage between electrodes separated by a dielectric material. In particular, U.S. Pat. No. 4,155,093 issued May 15, 1979 to Fotland et al discloses the generation of charged particles by breakdown of a gas by an electrical field between conducting electrodes separated by a dielectric. By applying a varying electrical voltage between these electrodes, which is large enough to overcome the critical electric field, a breakdown of the surrounding gas takes place and a pool of charged particles of both polarities is generated. A charged particle current of desired polarity is then created by combination of the inner electrical field created by the electrodes and an external field between the breakdown site and a dielectric surface so that particles of one polarity are transfered to the dielectric surface to form a latent image.

This patent further discloses a dot matrix charged particle generator for the formation of characters by dot matrix electrical charges on the dielectric surface. The generator comprises a sheet of dielectric material provided with electrodes on opposite sides thereof, the electrodes on the side of the dielectric material nearest the surface on which the charge is to be deposited having edge structures defined by apertures from which the charged particle can be discharged, in the above described manner, onto complementary areas of the dielectric surface.

A further development of this principle is disclosed in U.S. Pat. No. 4,160,257, issued July 3, 1979 to Carrish, which describes a charged particle generator in which, in addition to a high frequency potential applied between a first driver electrode and a second finger electrode separated by a dielectric member, a lesser constant potential is applied to a screen electrode, which is separated from the finger electrode by a second dielectric member. This use of the screen electrode has been found to improve the quality of the image produced.

In the embodiments described and illustrated in these two patents, the edge structures are defined by rows of individual apertures provided in the finger electrodes one at each of the locations where the electrodes on the opposite sides of the dielectric cross one another.

The alternating potential applied between the driver and finger electrodes to create charge images, or dots, cycles at radio frequency, normally about MHz order. Each single dot produced may be the result of a series of consecutive breakdowns created during a set of individual cycles. Ideally, each cycle would result in a breakdown or discharge at the same voltage and at the same location. However, analysis of charge particle creation at individual apertures has shown that the occurrence and location of breakdown is unpredictable and unreliable, and that there is considerable variation in the resulting printed dots formed. This limits the definition and image control achievable using print cartridges operating on this principle.

A further problem associated with print cartridges utilizing apertured finger electrodes has been the low efficiency of charge transfer from the charge creation site to the image receiving material. It has been revealed that this is due to a large extent to the divergent nature of the electrostatic field created by the electrodes: a very strong electric field between the finger and driver electrodes penetrates the apertures in the finger electrodes and pass towards the image receiving surface. As a result charged particles moving in this direction diverge towards the sides so that many of the particles do not reach the image receiving surface. Also, where the cartridge is provided with a screen electrode, the misdirected charged particles may collect behind the electrode where they are thought to be one of the factors involved in the creation of build-ups of material behind the screen electrode. This material, known as corona by-products, affects the quality of the image produced and may, in time, necessitate replacement of the cartridge.

SUMMARY OF THE INVENTION

It is an object of the present invention to provide a charge generating device having improved reliability and predictability of electrical discharge.

It is a further object of the present invention to provide a print cartridge for use in charge transfer imaging having improved reliability and predictability of image creation.

It is a still further object of the present invention to provide a print cartridge with increased efficiency by directing a greater portion of the charged particles created towards the image receiving surface.

Accordingly, in one of its aspects, the present invention provides a charge generating device having first electrodes and second electrodes separated by a dielectric. The electrodes define independent discharge locations and each of these locations comprises a plurality of electrical discharge sites.

According to a further aspect of the present invention, there is provided a print cartridge for use in charge transfer imaging comprising first and second electrodes on opposite sides of a dielectric layer. The first electrodes extend in a first direction and the second electrodes extend in a second direction to form an electrode matrix. Apertures defining edge structures are provided in the second electrodes at the locations where the electrodes cross, at least two such apertures being provided at each location.

By selectively energising electrodes by use of, for example, multiplexing, charge particle creating electrical discharges are produced at the desired apertures. A current of charged particles of desired polarity is extracted from these charge generating locations by applying a suitable external electric field. The current impinges on a dielectric surface spaced from the cartridge to form a latent image thereon.

The provision of a plurality of apertures at each cross over location allows for greater reliability in electrical discharge production, and also shapes the electric field created by the electrodes to focus the charged particle current directed to the image receiving dielectric surface.

BRIEF DESCRIPTION OF THE DRAWINGS

These and other aspects of the invention will now be described by way of example, with reference to the accompanying drawings, in which.

DETAILED DESCRIPTION OF PREFERRED EMBODIMENTS

Figure 1:
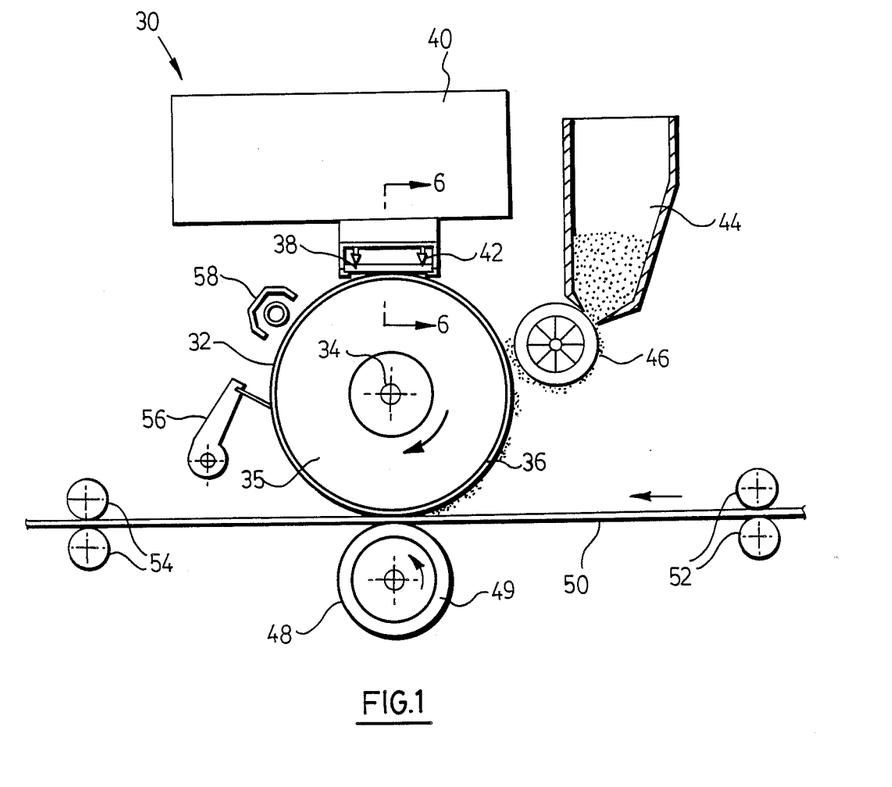
FIG. 1 is a diagrammatic side view of a charge transfer imaging printer incorporating a print cartridge in accordance with a preferred embodiment of the present invention.

Reference is made firstly to FIG. 1 which shows somewhat schematically a printer 30 incorporating a preferred embodiment of a print cartridge according to the present invention. This printer is illustrated primarily to demonstrate a preferred environment for the invention but other printers or charge transfer apparatus could benefit from the use of the invention.

A cylinder or drum 32 is mounted for rotation about an axis 34 and has an electrically conductive core 35 coated in a dielectric layer 36 capable of receiving a charge image from a print cartridge 38 driven by an electronic control system 40 and connected to the cartridge 38 by electrical connectors 42. As the drum rotates in the direction shown, a charge image is created by the cartridge 38 on the outer surface of the dielectric layer 36 and comes into contact with toner supplied from a hopper 44 by a feed mechanism 46. The resulting toner image is carried by the drum 32 towards a nip formed with a pressure roller 48 having a compliant outer layer 49 positioned in the path of a receptor such as a paper sheet 50 which enters between a pair of feed rollers 52. The pressure in the nip is sufficient to cause the toner to transfer to the paper sheet 50 and, because the axes of the drum 32 and roller 48 lie at an angle to one another, the toner will be fused to the receptor. The paper leaves the printer 30 between a pair of output rollers 54.

After passing through the nip between the cylinder 32 and the roller 48, any toner remaining on the surfaces of the dielectric layer 36 is removed by a scraper blade assembly 56, and any residual charge remaining on the surface is neutralized by a discharge head 58 positioned between the scraper blade assembly 56 and the cartridge 38.

Figure 2:
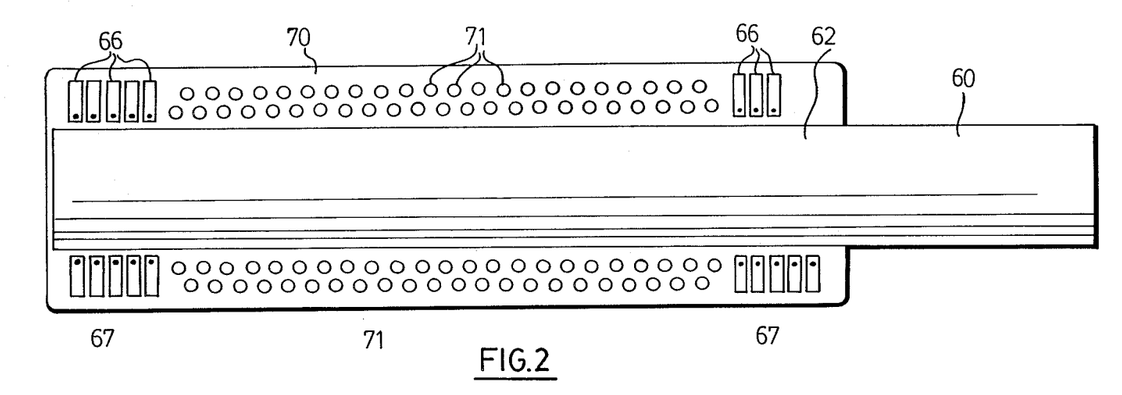
FIG. 2 is a view from above the cartridge.
Figure 3:
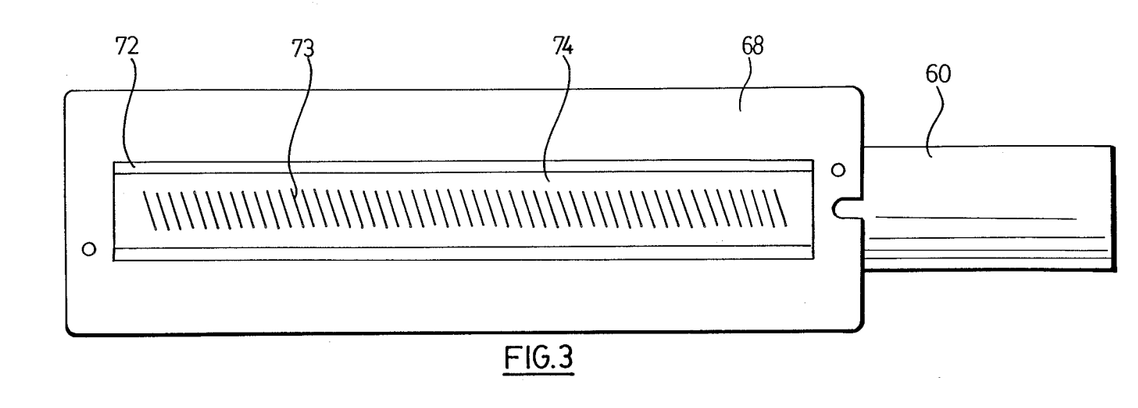
FIG. 3 is a view from below the cartridge.

Reference is next made to FIG. 2, which is a top view of the print cartridge 38. In this view, the cartridge is shown as it would appear looking down on the printer of FIG. 1, and has a handle 60 extending beyond the active part of the cartridge for engaging the cartridge in the printer. The handle is an extension of a rigid spine 62 of aluminum which extends beyond the cartridge. End contacts 66 67 for driver electrodes can be seen extending to either side of the spine 62 supported by a printed circuit board 70. Further, intermediate, elongate finger electrode contacts 71 also extend to either side of the spine, though they are sandwiched between a base member or bottom board 68 (better seen in FIG. 3) and the printed circuit board 70 and are normally only visible through contact apertures in the board 70 for receiving ends of the connectors 42 (FIG. 1). The bottom board 68 has a central slot 72 positioned about rows of small apertures 73 in a screen electrode 74.

The general arrangement of the laminates forming the cartridge will be described with reference to FIG. 4, which is drawn from below the cartridge. The board, or substrate 70 (FIG. 2), is of dielectric material such a glass reinforced epoxy and has printed on its underside a number of driver electrodes or drive lines, indicated collectively by the numeral 78. The driver electrodes 78 terminate at portions (not seen) which are connected, to inner ends of the contacts 66 and are parallel to and separated by a strip of dielectric 82, typically mica, from finger electrodes 84. Each of these finger electrodes defines groups 85 of individual apertures 86 forming edge structures, and extends from one of the elongate finger electrode contacts 71 to terminate in a support piece 87 for maintaining the finger electrodes in relationship to one another during cartridge manufacture. Also, the contacts 71 (FIG. 2) and support pieces 87 are formed integrally with the finger electrodes 84. A dielectric separator layer 92 lies between the finger electrodes 84 and the screen electrode 74 and has parallel slots 94 in alignment with the groups of apertures 85 in the finger electrodes where charged particle generation take place. In general each of the groups 85 defines a discharge location and the apertures 86 define individual discharge sites within that location.

Figure 4:
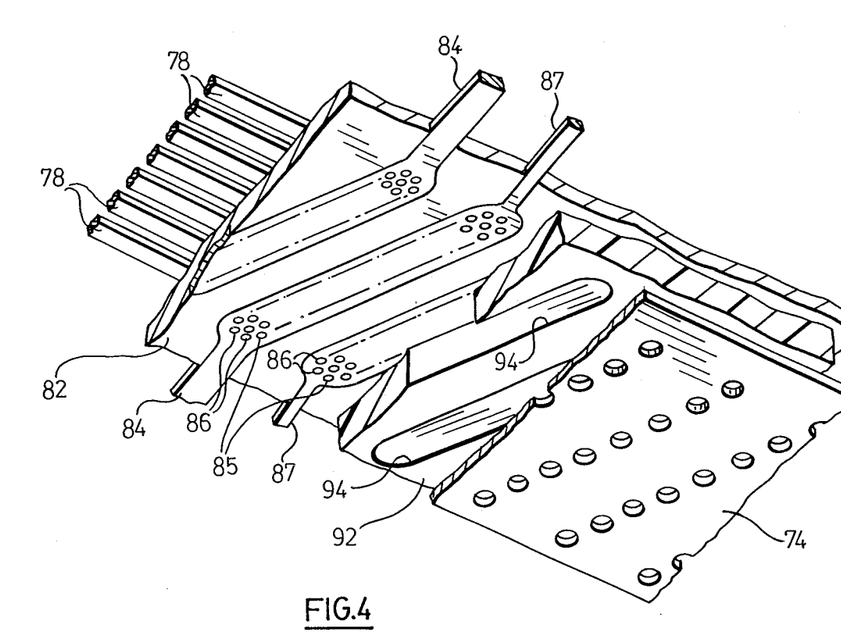
FIG. 4 is a perspective view of a portion of the print cartridge looking from the underside of the cartridge and showing layers in the construction.

The above description of FIG. 4 gives an overview of the arrangement of the various layers in the cartridge 38. Of course, it will be appreciated that layers of adhesive and the like have been omitted for clarity.

Figure 5:
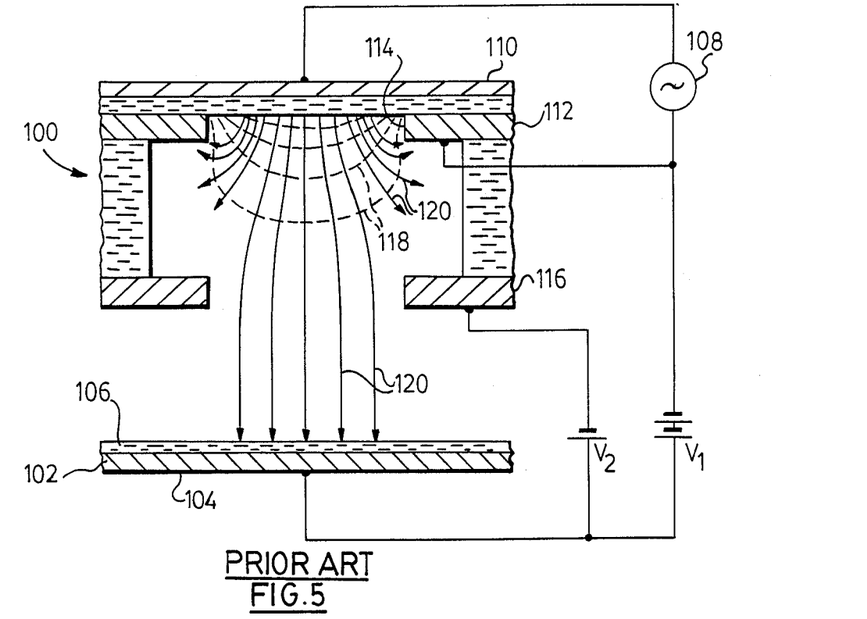
FIG. 5 is a schematic sectional view of a prior art cartridge corresponding to a portion of a view taken generally on line 6—6 of FIG. 1, and drawn to a larger scale, the view also including a schematic representation of the electrical connections for the cartridge and a portion of a print drum, and illustrating the trajectories of charged particles.

Reference is now made to FIG. 5 which shows a somewhat schematic view of what would be seen in a sectional view of a prior art cartridge 100 at a location where a driver electrode and a finger electrode intersect. A portion of a print drum 102, including a conductive core 104 and dielectric layer 106, is also shown.

As is now conventional in this art, an alternating potential, from a source 108, is applied between the driver and finger electrodes 110, 112 in combination with bias potentials $V_1$ $V_2$ to create an electrical discharge in apertures such as apertures 114 in the finger electrodes. Charged particles formed in the apertures 114 by the discharge are then subjected to an electrical field which causes them to form a charged particle current which is intended to impinge on dielectric layer 106 and form a latent image. An additional DC bias potential $V_2$ may be applied to a screen electrode 116 which primarily provides a screening effect on the oppositely charged particles as well as some lensing action on the charged particles in the current.

Control of the various electrodes to produce a desired image may be achieved by multiplexing, as described, for example, in U.S. Pat. No. 4,267,556 issued May 12, 1981 to Fotland et al, or in response to a digital input signal representing successive raster scan lines, as described, for example, in U.S. Pat. No. 4,494,129 issued Jan. 15, 1985 to Gretchev.

As the larger potential is applied between the driver and finger electrodes 110, 112, the electric field produced by the electrodes penetrates through the apertures 114 and predominates within the cartridge as shown by lines of equipotential 118. Due to the convex shape of this field particles formed in the apertures 114 follow divergent paths, as represented by field lines 120. While the screen electrode 116, where present, may assist in redirecting a portion of the diverging particles, it is clear that only a small proportion of particles will reach the dielectric layer 106 to form an image thereon. It can also be seen that a large proportion of the charged particles remain behind the screen 116, where it is thought that the particles contribute to the build up of corona by-products which ultimately affect the performance of the cartridge. Also, as mentioned above, the provision of a single aperture, and thus a single discharge zone, leads to unpredictable and variable image or dot production, due to the uncertainty of discharges occuring during a cycle in the applied alternating potential, and the uncertainty of the location of the origin of the discharge in the aperture.

Figure 6:
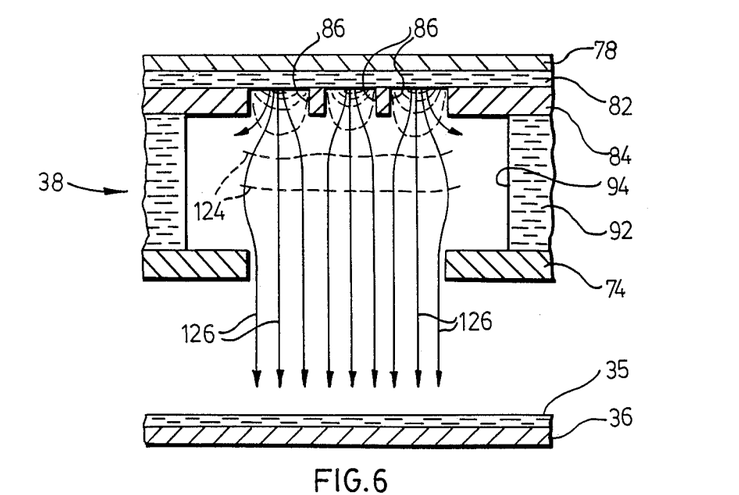
FIG. 6 is a view similar to FIG. 5 and illustrating the present cartridge.

FIG. 6 shows a view, similar to FIG. 5, of a cartridge configuration which is intended to overcome these problems. The cartridge includes a group 85 of apertures 86 in finger electrode 84 at each crossover location of the electrodes 78, 84

The electric field created between the driver and finger electrodes 78, 84 as illustrated by lines of equipotential 124, does not extend significantly beyond the dielectric 82, and as a result produces a more homogenous electrical field which causes a straighter charge particle flow 126. Consequently greater number of charged particles are directed towards the dielectric surface 35. Also, because many separate discharges are generated in the group of apertures at each particular location, the reliability and predictability of discharges increases.

Figure 7:
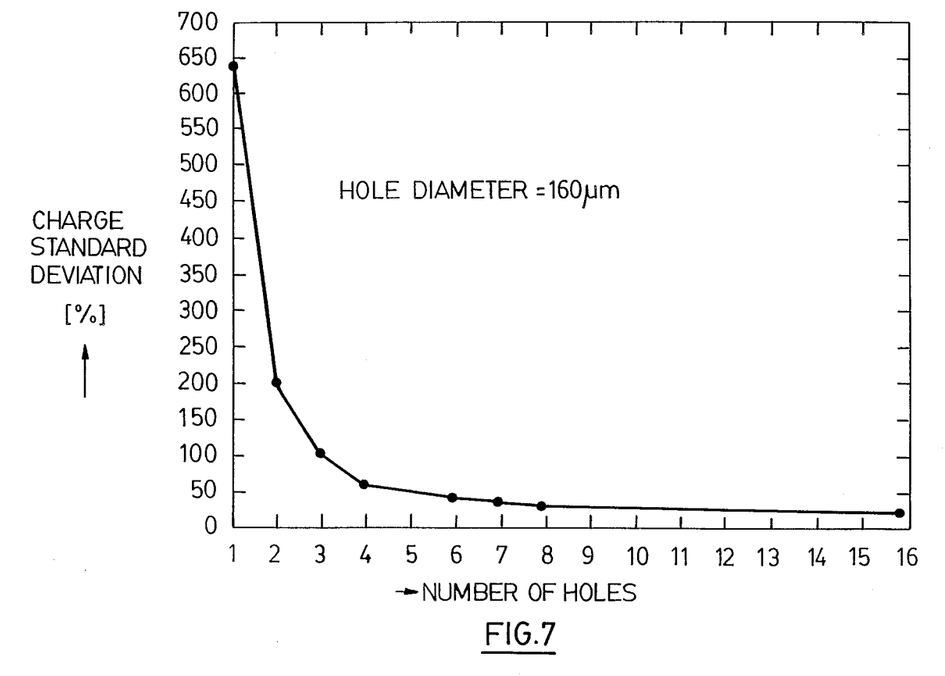
FIG. 7 is a graph showing the relationship between dot variability and the number of finger electrode apertures.

The increased predictability of dot formation is illustrated by FIG. 7 which shows graphs of standard deviation of emitted charge amount versus number of holes or discharge sites in the finger electrode, during one cycle. It can be seen that the consistency of emitted charge amount increases markedly with increase in hole numbers due to initation of electrical discharge in a plurality of separate sites leading to an increased statistical probability of discharge.

Figure 8:
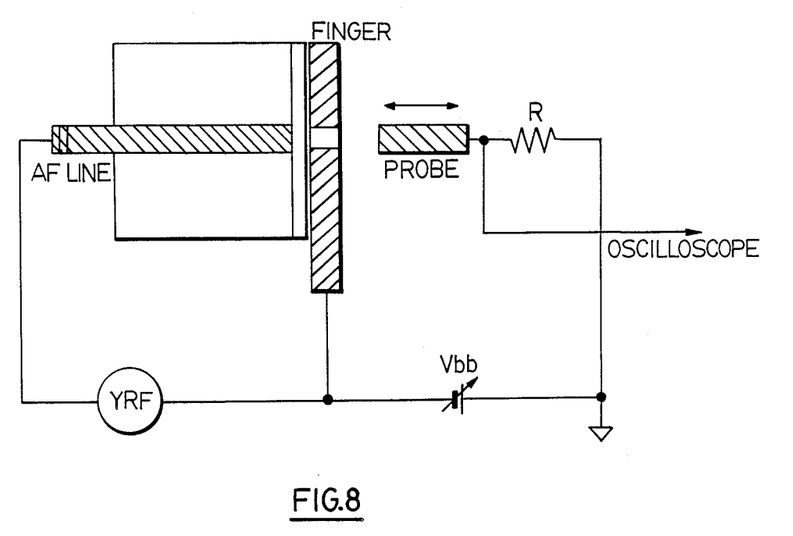
FIG. 8 is a diagrammatic representation of test equipment used to obtain the results shown in FIG. 7.

Standard deviation (SD) is given by the formula:

$$\% SD = \frac{\sqrt{\sum_n (q_n - q)^2}}{n \cdot q} \times 100$$

where
$q_n$ = individual emitted charge amounts
$q$ = mean value of emitted charges
$n$ = number of measurements FIG. 8 represents the experiment conducted to obtain the results used to plot the graph of FIG. 7. A single pulse generator was applied between the finger and driving electrodes and the charged particle current was extracted by an external field between the probe and finger electrodes. The current circuit was closed by a resistor R which converted the current into a voltage signal. This signal was further recorded by a digital oscilloscope and integrated. The background signal (noise and induced voltage) was measured similarly but with zero DC voltage applied between the probe and finger electrodes. Its integral value was extracted from the charge measurements.

The finger electrodes 84 illustrated in FIGS. 6 and 7 are provided with seven apertures at each location. However, improved results will be obtained by use of any number of apertures, as illustrated by the graph.

It will be appreciated by those skilled in the art that the particular cartridge described above is purely exemplary of a suitable environment for a multiple source charge particle generator, and that different configurations of cartridge will benefit from the invention. Also, the applications of the invention are not limited to use in the form of charge transfer imaging and may be utilised in any suitable device which uses electrical breakdown to produce the charged particle current.

More particularly the group 85 of openings may be arranged with a variety of individual openings 86 of differing shapes consistent with enhancing the efficiency of the charge transfer imaging capacity of the structure.

We claim:
1. A charge generating device comprising:
first and second electrodes;
a dielectric between the first and second electrodes; and
the second electrodes defining independent discharge locations with each of said discharge locations comprising a plurality of discharge sites.

2. A charge generating device as claimed in claim 1, in which the discharge sites are defined by a plurality of apertures.

3. In a print cartridge for use in charge transfer imaging of a type having first electrodes and second electrodes separated by a dielectric, the second electrodes defining independent discharge locations and each of said discharge locations comprising a plurality of discharge sites, the first electrodes extending in a first direction along one side of the dielectric and the second electrodes extending in a second direction along the opposite side of the dielectric layer, the improvement in which each of the discharge locations is defined by a plurality of apertures in the said second electrodes.

4. Apparatus as claimed in claim 3, and further comprising an apertured third electrode and an apertured second dielectric layer spaced from the second electrode.

5. Apparatus as claimed in claim 3, in which said first electrodes are carried by a dielectric substrate.

6. In a print cartridge for use in charge transfer imaging of a type having a layer of dielectric material, a plurality of first electrodes extending in a first direction along one side of the dielectric layer, a plurality of second electrodes extending in a second direction along the opposite side of the dielectric, and edge structures provided in said second electrodes disposed at locations opposite said first electrodes, the improvement in which the edge structure at each location is formed by a plurality of apertures in said second electrodes to provide a plurality of discrete charge generation sites at each location.

7. Apparatus as claimed in claim 6, and further including an apertured third electrode and an apertured second dielectric layer spaced from said second electrodes.

8. Apparatus as claimed in claim 6, in which said first electrodes are carried by a dielectric substrate.

9. A printer comprising:
a support structure;
a print cartridge mounted on the support structure and including a layer of dielectric material, first electrodes extending in a first direction along one side of the dielectric layer, second electrodes extending in a second direction along an opposite side of the dielectric layer, and edge structures provided in said second electrodes disposed at locations opposite the said first electrodes and defined by a plurality of apertures in said second electrodes, a print drum supported on the support structure for receiving a charge image from the print cartridge;
toner supply means mounted on the support structure for supplying toner to the print drum;
a pressure roller mounted on the support structure forming a nip with the drum; and
feeding means mounted on the support for feeding an image receiving receptor to the nip for transferring toner images to the image receiving receptor.

10. Apparatus as claimed in claim 9 and further including an apertured third electrode and an apertured second dielectric layer spaced from said second electrodes.

11. Apparatus as claimed in claim 8, in which said first electrodes are carried by a dielectric substrate.

12. A method of improving the image produced by a print cartridge for use in charge transfer imaging having a layer of dielectric material, a plurality of first electrodes extending in a first direction along one side of the dielectric layer, a plurality of second electrodes extending in a second direction along the opposite side of the dielectric layer to form an electrode matrix and edge structures provided in the second electrodes disposed at locations opposite the first electrodes, comprising:
providing a plurality of discrete charge generation sites at each of said locations.

13. A method of improving the image produced by a print cartridge for use in charge transfer imaging having a layer of dielectric material, a plurality of first electrodes extending in a first direction along one side of the dielectric layer, a plurality of second electrodes extending in a second direction along the opposite side of the dielectric layer to form an electrode matrix and edge structures provided in the second electrodes disposed at locations opposite the first electrodes, the comprising:
providing a plurality of apertures at each of said locations to form a plurality of discrete charge generation sites.

* * * * *